United States Patent [19]
Takahashi et al.

[11] Patent Number: 5,694,003
[45] Date of Patent: Dec. 2, 1997

[54] PLURAL GUN COLOR CRT WITH INCLINED INDEX PHOSPHOR LAYERS

[75] Inventors: Toru Takahashi, Kumagaya; Yuji Kuwabara; Eiji Kamohara, both of Fukaya, all of Japan

[73] Assignee: Kabushiki Kaisha Toshiba, Kawasaki, Japan

[21] Appl. No.: 595,480

[22] Filed: Feb. 1, 1996

[30] Foreign Application Priority Data

Feb. 3, 1995 [JP] Japan .................... 7-016908

[51] Int. Cl.$^6$ .................... H01J 29/51
[52] U.S. Cl. .................... 315/9; 315/10; 348/383; 348/813
[58] Field of Search .................... 315/9, 10, 13.1; 348/36, 383, 813

[56] References Cited

U.S. PATENT DOCUMENTS

| | | | |
|---|---|---|---|
| 4,259,687 | 3/1981 | Shinkai et al. | 348/813 |
| 4,792,720 | 12/1988 | Takenaka et al. | 313/409 |
| 5,418,426 | 5/1995 | Rilly | 315/9 |

FOREIGN PATENT DOCUMENTS

| | | |
|---|---|---|
| 0 226 423 | 6/1987 | European Pat. Off. . |
| 0 556 839 | 8/1993 | European Pat. Off. . |
| 0 600 325 | 6/1994 | European Pat. Off. . |
| 6-327019 | 11/1994 | Japan . |

OTHER PUBLICATIONS

Patent Abstracts of Japan, vol. 015, No. 423 (E–1127), Oct. 28, 1991 & JP-A-03 176947 (Matsushita Electron Corp), Jul. 31, 1991.

Patent Abstracts of Japan, vol. 010, No. 285 (E–441), Sep. 27, 1986 & JP-A-61 104542 (Hitachi Ltd), May 22, 1986.

*Primary Examiner*—Robert Pascal
*Assistant Examiner*—Justin P. Bettendorf
*Attorney, Agent, or Firm*—Cushman Darby & Cushman, IP Group of Pillsbury Madison & Sutro LLP

[57] ABSTRACT

A color cathode-ray tube comprises a phosphor screen formed on an inner surface of a face plate and having a plurality of three-color phosphor layers. A plurality of first index phosphor layers are provided on the phosphor screen and extending in parallel to the three-color phosphor layers, and a plurality of second index phosphor layers are provided on the phosphor screen and inclined to the three-color phosphor layers at a predetermined angle. Electron guns are provided in an envelope and emit electron beams to the screen section so as to dividedly scan a plurality of regions of the screen section. Photoelectric conversion devices are provided on the envelope and detect first index signals and second index signals generated from the first and second index phosphor layers by scanning of the electron beams, respectively. Deflection devices for deflecting the electron beams are controlled by a controller in response to the detected first and second index signals.

7 Claims, 6 Drawing Sheets

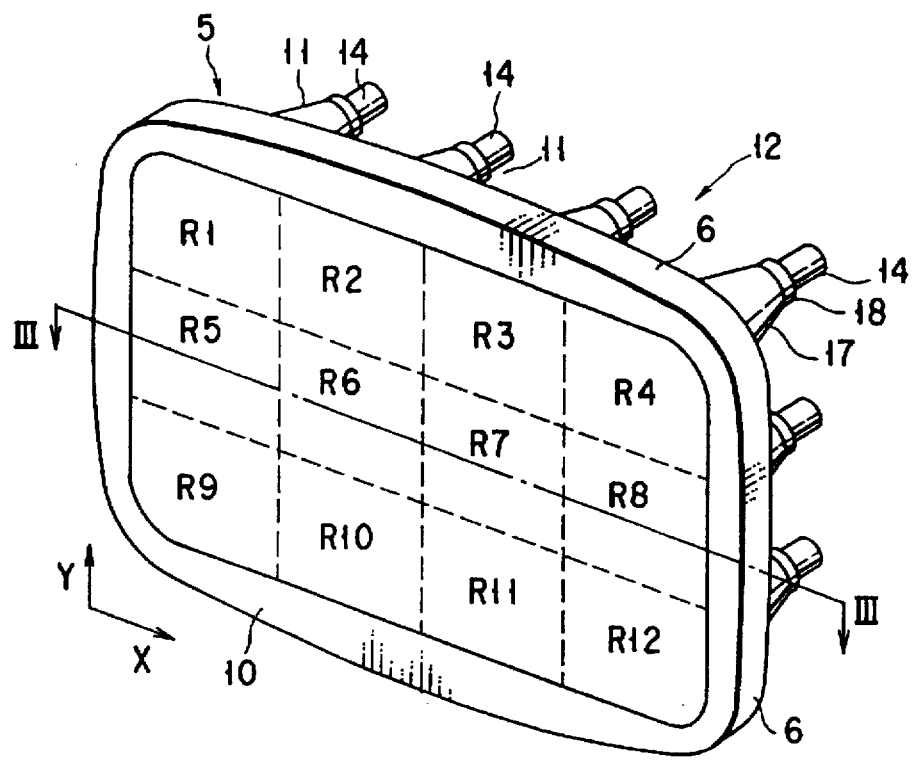
F I G. 1
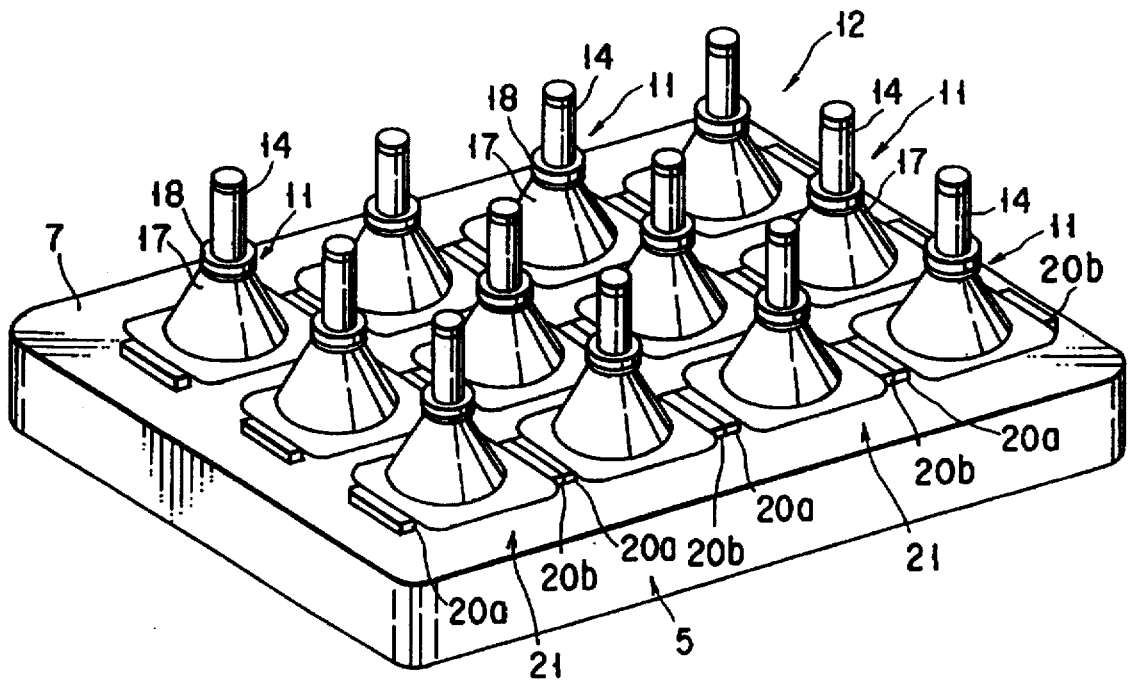
F I G. 2

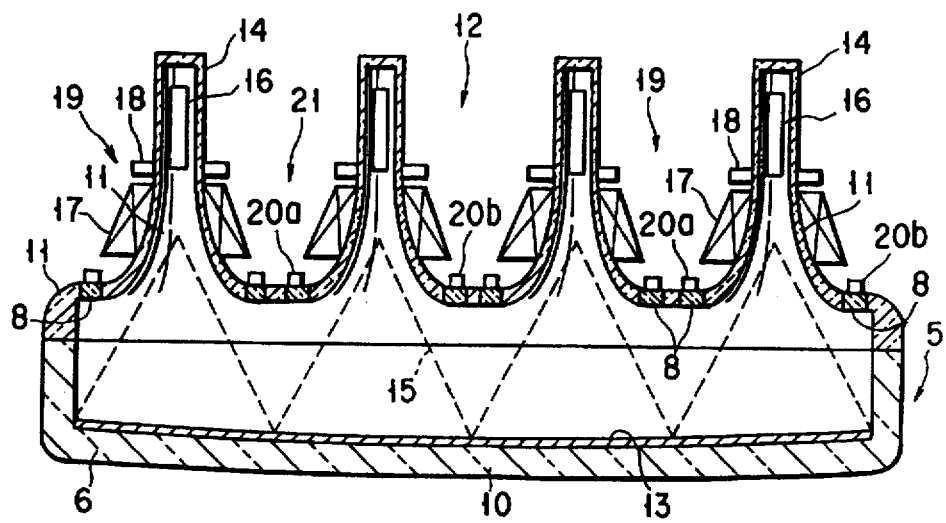
F I G. 3
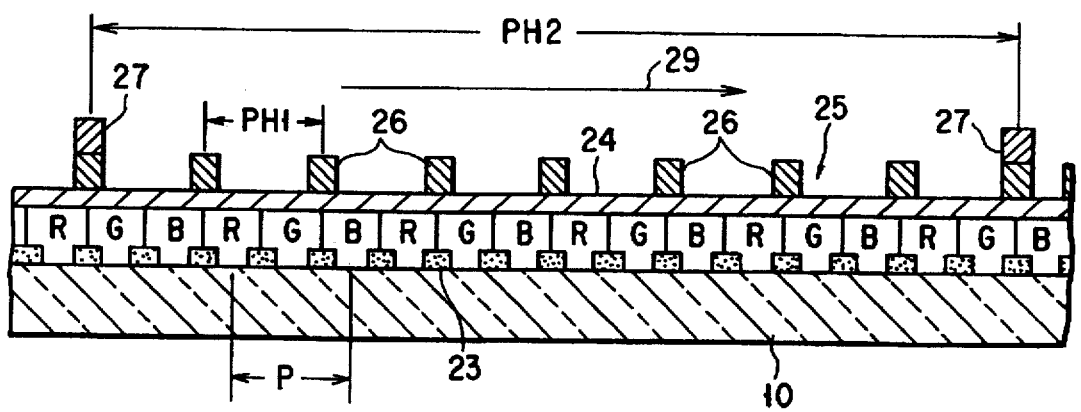
F I G. 4

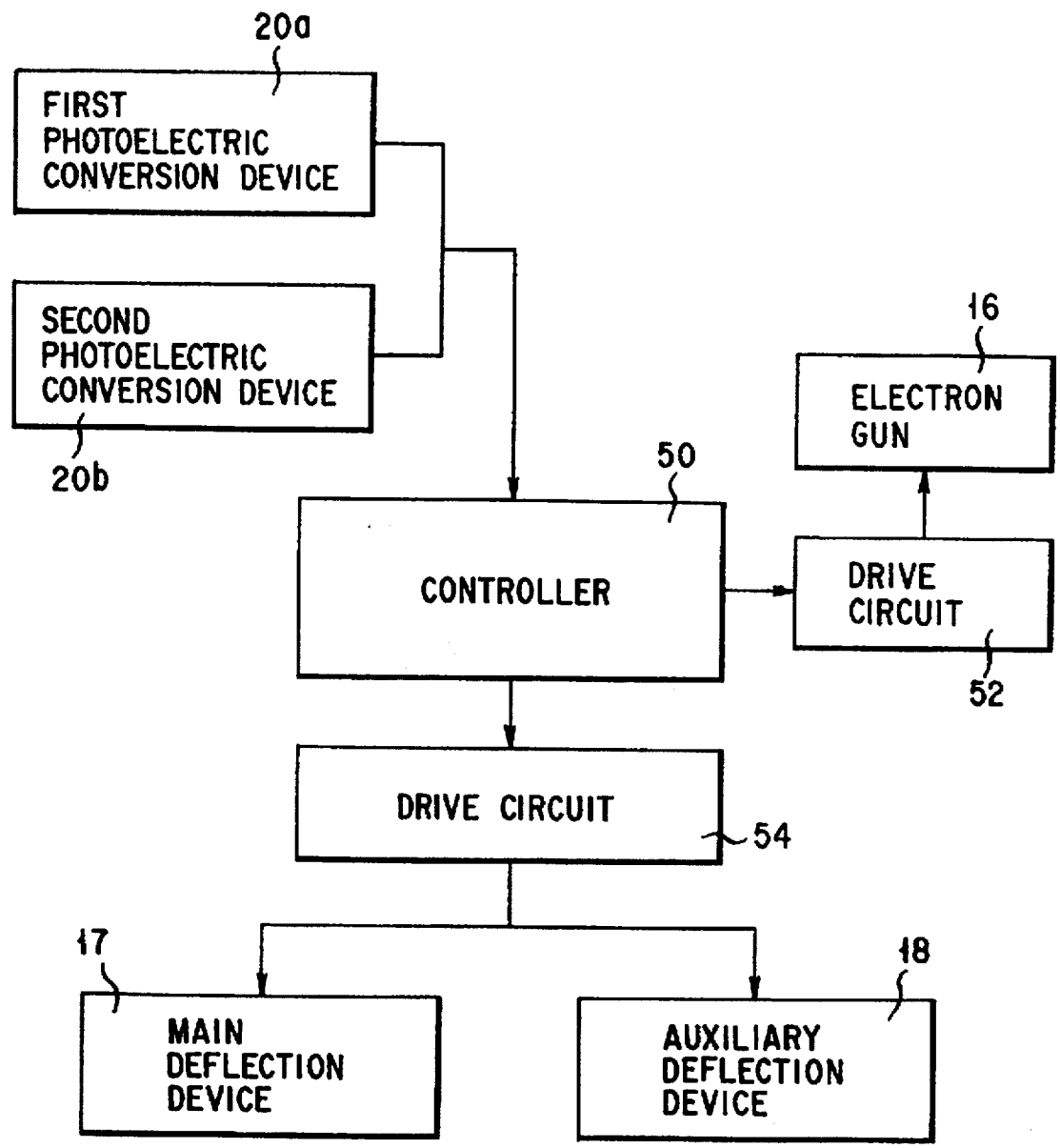
F I G. 6

PLURAL GUN COLOR CRT WITH INCLINED INDEX PHOSPHOR LAYERS

BACKGROUND OF THE INVENTION

1. Field of the Invention

The present invention relates to an index type color cathode-ray tube wherein a plurality of regions of a phosphor screen are dividedly scanned with electron beams emitted from a plurality of electron guns.

2. Description of the Related Art

As a method of enlarging a screen of a cathode-ray tube, there is provided a cathode-ray tube apparatus including a plurality of small-sized cathode-ray tubes arranged separately from one another to display an image of high luminance and high resolution. This type of cathode-ray tube apparatus is effective in constituting a large-sized screen having a number of regions which is installed outdoors. However, in a medium-sized screen of about 40 inches, since the seams between image display regions of respective cathode-ray tubes are conspicuous, an image displayed on the regions is hard to see. In particular, the conspicuous seams are fatal defects when the above cathode-ray tube apparatus is employed as a television set for domestic use or a graphic display terminal for computer aided design (CAD).

For example, U.S. Pat. No. 3,071,706 discloses a multineck type cathode-ray tube apparatus. In this apparatus, a plurality of cathode-ray tubes are arranged and their phosphor screens are formed integrally as a single phosphor screen. The phosphor screen has plural regions and these regions are dividedly scanned with electron beams emitted from a plurality of electron guns disposed in the necks of a plurality of funnels, thereby displaying one composite image.

According to the multineck type cathode-ray tube apparatus having an integrally formed phosphor screen, the above problem of the cathode-ray tube apparatus including a plurality of separated cathode-ray tubes, that is, the seams between adjacent image display regions, can be eliminated and therefore a considerably clearer image can be displayed. However, in this type of apparatus, since the display regions of the phosphor screen to be scanned are very close to one another, there occurs a slight difference among them in luminance, contrast, color hue, etc.

More specifically, when electron beams dividedly scan a plurality of regions of the integrated phosphor screen, they undergo various types of deflection aberration and accordingly the rasters of the respective regions exhibit distortion and nonlinearity particularly on the periphery of the regions. It is necessary to align scanning lines and match images at the same time between adjacent regions, but it is very difficult to make the scanning lines of the adjacent regions parallel to each other while correcting the distortion and nonlinearity. Since there is a case where the intervals between the scanning lines may be lengthened or shortened in the boundary between the adjacent regions arranged in the vertical direction, it is also difficult to make the intervals constant. In this case, the seams between the adjacent regions become conspicuous.

In a color cathode-ray tube, a color has to be selected such that an electron beam emitted from an electron gun is correctly landed on a three-color phosphor layer of a phosphor screen. However, in a shadow mask type color cathode-ray tube for performing the color selection using a shadow mask, the shadow mask is dislocated with respect to the phosphor screen. Thus, when the electron beam is landed on the three-color phosphor layer, it is easy to dislocate, and the above-described distortion and nonlinearity are remarkably difficult to correct.

Jpn. Pat. Appln. KOKAI Publication No. 6-327019, U.S. Pat. No. 5,418,426, and the other documents disclose an index type color cathode-ray tube as an apparatus capable of resolving the foregoing problems of the shadow mask type color cathode-ray tube. In this type of color cathode-ray tubes, index phosphor layers are formed on a phosphor screen or a shadow mask. However, in this color cathode-ray tube which is so constituted that the index phosphor layers for generating index signals are simply formed on a phosphor screen or a shadow mask, the problem of the seams between adjacent regions remains unresolved and in particular the seams are conspicuous between the adjacent regions arranged in the vertical direction.

SUMMARY OF THE INVENTION

The present invention has been contrived in consideration of the above circumstances and its object is to provide a color cathode-ray tube wherein a plurality of regions of a phosphor screen are dividedly scanned with an electron beam emitted from a plurality of electron guns and which easily makes the seams between adjacent regions inconspicuous thereby obtaining a good image.

To attain the above object, according to one aspect of the present invention, there is provided a color cathode-ray tube comprising:

- an envelope including a substantially rectangular face plate having first and second axes crossing each other at right angles;
- a screen section provided on an inner surface of the face plate, the screen section including a phosphor screen having a plurality of three-color phosphor layers each of which extends along the first axis and which are arranged in series in a direction along the second axis, a plurality of first index phosphor layers provided on the phosphor screen in parallel to the three-color phosphor layers, and a plurality of second index phosphor layers provided on the phosphor screen and inclined to the three-color phosphor layers at a predetermined angle;
- a plurality of electron guns provided in the envelope, for emitting electron beams to the screen section and dividedly scanning a plurality of regions of the screen section;
- a plurality of deflection means for deflecting the electron beams emitted from the respective electron guns;
- a plurality of photoelectric conversion sections provided in correspondence to the regions, each of the photoelectric conversion sections including first photoelectric conversion means for detecting first index signals generated from the first index phosphor layers by scanning of the electron beams, and second photoelectric conversion means for detecting second index signals generated from the second index phosphor layers by scanning of the electron beams; and
- control means for controlling the deflection means in response to the first and second index signals detected by the photoelectric conversion means.

According to another aspect of the present invention, there is provided a color cathode-ray tube comprising:

- an envelope including a substantially rectangular face plate having first and second axes crossing each other at right angles;

a screen section provided on an inner surface of the face plate, the screen section including a phosphor screen having a plurality of three-color phosphor layers each of which extends along the first axis and which are arranged in series in a direction along the second axis;

a shadow mask provided in the envelope so as to face the screen section;

a plurality of first index phosphor layers provided on the shadow mask in parallel to the three-color phosphor layers;

a plurality of second index phosphor layers provided on the shadow mask and inclined to the three-color phosphor layers at a predetermined angle;

a plurality of electron guns provided in the envelope, for emitting electron beams to the screen section through the shadow mask and dividedly scanning a plurality of regions of the screen section;

a plurality of deflection means for deflecting the electron beams emitted from the respective electron guns;

a plurality of photoelectric conversion sections provided in correspondence to the regions, each of the plurality of photoelectric conversion sections including first photoelectric conversion means for detecting first index signals generated from the first index phosphor layers by scanning of the electron beams, and second photoelectric conversion means for detecting second index signals generated from the second index phosphor layers by scanning of the electron beams; and control means for controlling the deflection means in response to the first and second index signals detected by the photoelectric conversion sections.

According to the color cathode-ray tube so constructed, when the plural regions of the screen section are scanned with the electron beams, the first and second index phosphor layers are also scanned and generate first and second signals, respectively. If the first and second index signals are detected by the first and second photoelectric conversion means, the location of the electron beams scanning the phosphor screen can be detected two-dimensionally. It is thus possible to properly correct the location of electron beams and the timing of video signals in response to the first and second index signals. Consequently, the scanning lines of each electron beam can be linearly corrected and the raster of the scanning lines can be made rectangular and, at the same time, a video signal can be selected in accordance with the three-color phosphor layers, thereby making the seams between images formed on adjacent regions inconspicuous.

Furthermore, according to the above color cathode-ray tube, the first and second index phosphor layers are formed of phosphors having different peak values of emission spectrum. Therefore, the first and second index signals generated from the first and second index phosphor layers can be detected separately from each other, and a stably-operated color cathode-ray tube can be achieved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 1 to 8 illustrate a color cathode-ray tube according to an embodiment of the present invention, in which:

FIG. 1 is a perspective view of the color cathode-ray tube seen from its front,

FIG. 2 is a perspective view of the color cathode-ray tube seen from its back,

FIG. 3 is a cross-sectional view taken along line III—III in FIG. 1,

FIG. 4 is an enlarged cross-sectional view of a screen section of the color cathode-ray tube, FIG. 5 is a plan view of the screen section, FIG. 6 is a block diagram schematically showing a control system of the color cathode-ray tube, FIG. 7 is a view showing index signals, and FIG. 8 is a schematic view for explaining a method of correcting the scan of the screen section with an electron beam;

DETAILED DESCRIPTION OF THE PREFERRED EMBODIMENTS

Figure 5:
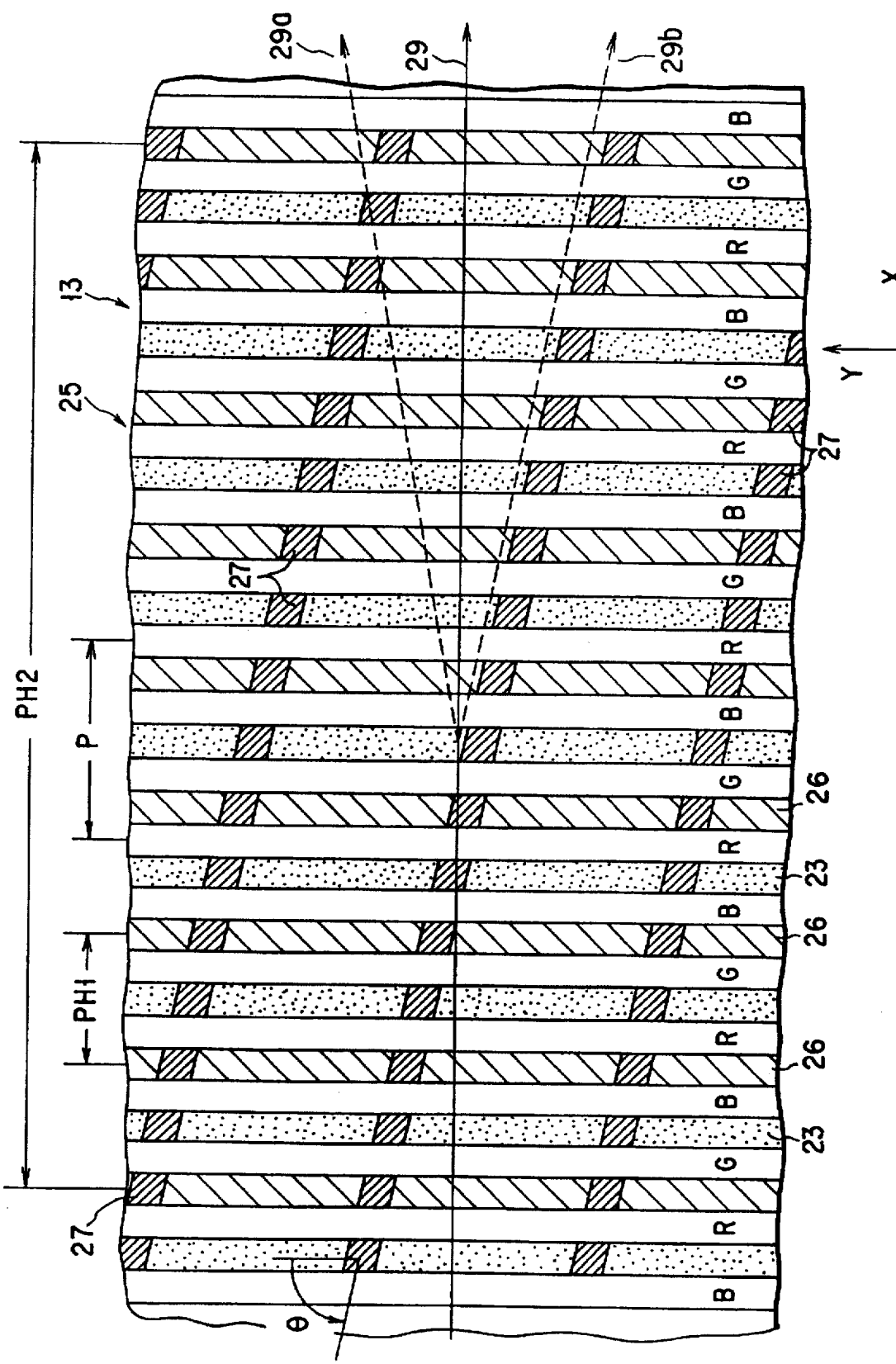
Figure 7:
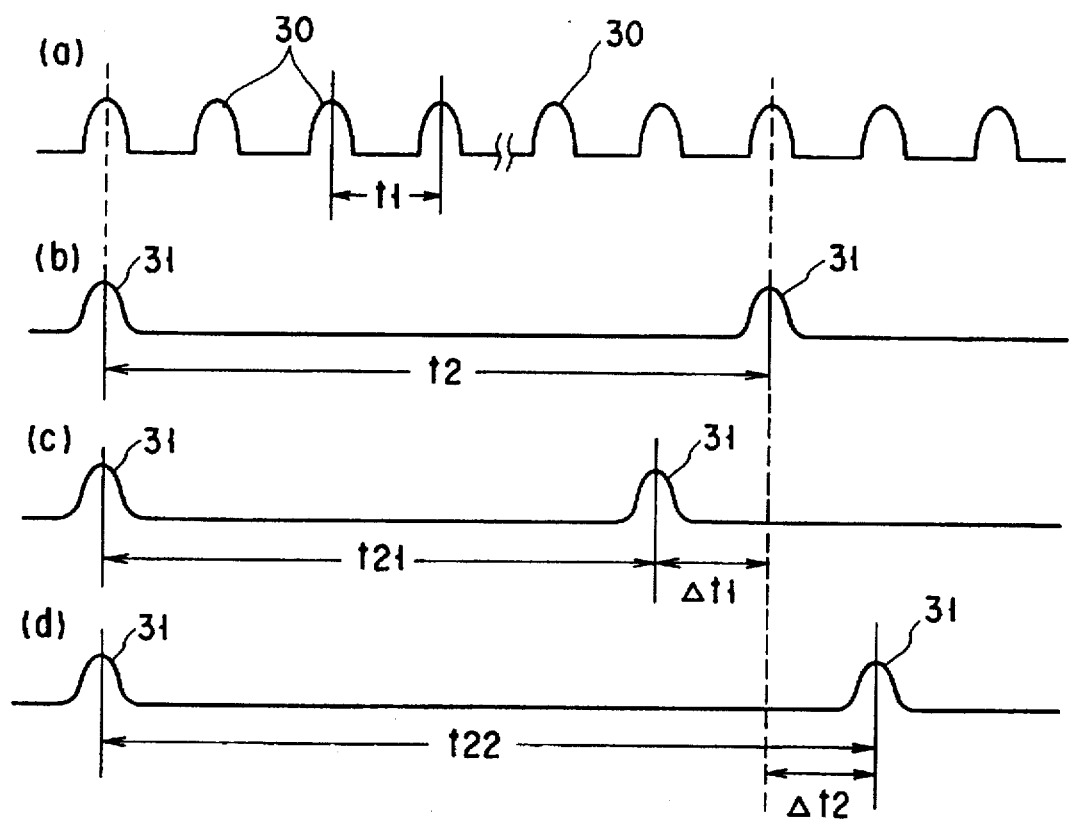

A color cathode-ray tube according to a first embodiment of the present invention will now be described in detail with reference to FIGS. 1 to 8.

As illustrated in FIGS. 1 to 3, the color cathode-ray tube has a vacuum envelope 5 (FIGS. 1–3) which includes a substantially rectangular, flat, glass-made face plate 10 (FIGS. 1 and 3) with a vertical axis (Y-axis, first axis) and a horizontal axis (X-axis, second axis) perpendicular to the vertical axis, a frame-like, glass-made sidewall 6 (FIGS. 1 and 3) connected to the periphery of the face plate 10 and extending substantially perpendicularly to the face plate, a substantially rectangular, glass-made rear plate 7 (FIG. 2) adhered to the sidewall in parallel to the face plate 10, and a funnel section 12 (FIGS. 1–3) joined onto the rear plate 7. The funnel section 12 has a plurality of funnels 11 (FIGS. 1–3) arranged so as to have a predetermined relationship. For example, twelve funnels 11 are arranged in matrix such that four funnels are in the X-axis direction and three funnels are in the Y-axis direction. A screen section 13 (FIG. 3) is formed on the inner surface of the face plate 10 so as to be integrated into one component.

An electron gun 16 (FIG. 3) for emitting a single electron beam 15 (FIG. 3) toward the screen section 13, is provided in a neck 14 (FIG. 1–3) of each of the funnels 11 of the funnel section 12. A deflection section 19 (FIG. 3) including a main deflection device 17 (FIG. 1–3) and an auxiliary one 18 FIGS. 1–3 is attached to the outer periphery of each of the funnels 11. Light-transmittable light-receiving windows 8 (FIG. 3) are formed in the rear plate 7 in such a manner that each of the funnels 11 is interposed between two windows in the X-axis direction. A photoelectric conversion section 21 (FIG. 2) is provided on the outer surface of the rear plate 7 for each of the funnels 11 which correspond to a plurality of regions R1 to R12 of a phosphor screen (described later). Each of the sections 21 includes a pair of first and second photoelectric conversion devices 20a and 20b (FIGS. 2–3) for detecting light having different specific wavelengths, and these devices are arranged opposite to their respective light-receiving windows 8.

In the color cathode-ray tube described above, the single electron beam 15 emitted from each of the electron guns 16 is deflected by horizontal and vertical magnetic fields generated from the main deflection device 17 and scans a predetermined region of the screen section 13. More specifically, in the first embodiment, the single electron beam 15 emitted from each of twelve electron guns 16 provided in the necks 14 of twelve funnels 11, is deflected in horizontal and vertical directions by magnetic fields generated from twelve deflection devices 17, and the deflected beams dividedly scan twelve regions R1 to R12 of the screen section 13, four of which are arranged in the horizontal direction and three of which are done in the vertical direction.

The regions R1 to R12 are over-scanned in the horizontal and vertical directions, and the over-scan is performed by cutting off a color selection signal supplied to a predetermined electrode of each of the electron guns 16. Then, by controlling a drive circuit for driving the electron guns 16 and main deflection device 17, images (divided images) are continuously formed on the regions R1 to R12, with the result that a composite color image free of a break or an overlap can be displayed on the screen section 13. This screen section 13 is rectangular in the ratio of four to three or sixteen to nine.

In FIG. 1, the regions R1 to R12 are defined by broken lines; however, these lines do not exist but are shown only for your information.

As shown in FIGS. 4 and 5, the screen section 13 (FIG. 5) includes a metal back phosphor screen 25 (FIGS. 4–5). This screen 25 is constituted as follows. A plurality of sets of strip-shaped three-color phosphor layers B, G and R, which extend in the Y-axis direction to emit light beams of blue, green and red, are formed on the inner surface of the face plate 10 (FIG. 4) in parallel to one another at predetermined pitches PH1 in the X-axis direction. Strip-shaped light absorbing layers 23 (FIG. 4–5) are formed on the inner surface of the face plate 10 to extend between the phosphor layers B, G and R, and aluminum evaporation films 24 (FIG. 4) formed on the backs of the three-color phosphor layers and the light absorbing layers 23.

A plurality of strip-shaped first index phosphor layers 26 (FIG.4–5) extending in the Y direction, are formed on those portions of the aluminum evaporation film 24 which overlap the absorbing layers 23, in parallel to one another at pitches PH1 in the X direction. Further, a number of dot-like second index phosphor layers 27 (FIGS. 4–5) are formed on the aluminum evaporation film 24 along plural straight lines which are inclined right or left at a predetermined angle θ to the three-color phosphor layers B, G and R and are in parallel to one another at predetermined pitches in the Y-axis direction, and the second index phosphor layers 27 are located at those portions which overlap the light absorbing layers 23. The layers 27 are arranged at pitches PH2 with respect to a common line extending in the X-axis direction.

If P indicates the arrangement pitch of the three-color phosphor layers B, G and R, the arrangement pitches PH1 and PH2 of the first and second index phosphor layers 26 and 27 in the X-axis direction are set as follows:

PH1=(⅔)P

PH2=(⅔)n·P=n·PH1 where n is an integer.

For example, when the width of each of the three-color phosphor layers B, G and R and that of the light absorbing layer 23 are 0.100 mm, if P is 0.600 mm and n is 8, the pitch PH2 is set to 3.200 mm and the angle θ is set to about 60°.

In the screen section 13, the three-color phosphor layers B, G and R of the phosphor screen 25 are formed of P22 or a phosphor for a color projection tube, whereas the first and second index phosphor layers 26 and 27 are formed of two phosphors having different peak values of emission spectrum, which are selected from among P36 (ZnCdS: Ag, Ni), P37 (ZnS: Ag, Ni), P46 ($Y_3Al_5O_{12}$: Ce), P47 ($Y_2SiO_5$: Ce), and the like. For example, while the first index phosphor layer 26 is formed of a phosphor of P46 whose peak value is about 400 nm, the second index phosphor layer 27 is formed of a phosphor of P47 whose peak value is about 530 nm.

As shown in FIG. 6, the first and second photoelectric conversion devices 20a and 20b of each photoelectric conversion section 21 are connected to a controller 50 and supply detection signals to the controller. The electron gun 16 is driven by a drive circuit 52 under the control of the controller 50. Similarly, the main deflection device 17 and auxiliary deflection device 18 are driven by a drive circuit 54 under the control of the controller 50.

An operation of the color cathode-ray tube having the foregoing constitution will now be described.

In a conventional color cathode-ray tube, an electron beam emitted from a single electron gun is deflected by an electric field generated from a deflection device, and the entire surface of a phosphor screen is scanned with the deflected beam, thereby reproducing a color image. In contrast, according to the color cathode-ray tube of the embodiment of the present invention, the electron beams 15 emitted from the electron guns 16 provided in the necks 14 of the twelve funnels 11, are deflected in the horizontal and vertical directions by the electric fields generated from the twelve deflection devices 17, the twelve regions R1 to R12 of the screen section 13 are dividedly scanned with the deflected beams, and the images formed on the regions R1 to R12 are composed into a color image.

When the regions R1 to R12 are scanned with the electron beams, the first and second index phosphor layers 26 and 27 are also scanned and emit light. The scanning and color selection of the regions R1 to R12 are performed by controlling the drive circuits 52 and 54 for driving the electron guns 16, main deflection devices 17 and auxiliary deflection devices 18 on the basis of the light emission of the first and second index phosphor layers 26 and 27. More specifically, the light emitted from the first index phosphor layers 26 arranged in each of the regions R1 to R12 is received as first index signals by a first photoelectric conversion device 20a corresponding the region, while the light emitted from the second index phosphor layers 27 is received as second index signals by a second photoelectric conversion device 20b corresponding thereto. These index signals are converted into electrical signals. By controlling the drive circuits 52, 54 in response to the electrical signals, the scanning and color selection of the regions R1 to R12 are performed.

For example, the screen section 13 is scanned with the electron beam in the X-axis direction as indicated by solid line 29 in FIGS. 4 and 5, the first index phosphor layers 26 issue first index signals 30 as shown in FIG. 7(a). The position of the electron beam in the X-axis direction can be detected from the first index signals 30. The first index signals 30 are fed back to the drive circuit 52 for driving the electron gun 16 so that video signals for three colors of blue, green and red are selectively supplied to predetermined electrodes of the electron gun 16 in response to the first index signals 30 from the first index phosphor layers 26.

Since a color is selected in response to the first index signals 30, a color image can be displayed as in the case of the conventional index type color cathode-ray tube. Since, furthermore, the position of the electron beam in the X-axis direction can be known, the location of a raster at the end portion of each region in the X-axis direction and the video signal can be suitably controlled.

If the screen section 13 is scanned with an electron beam in the X-axis direction, second index signals 31 are generated from the second index phosphor layers 27 as shown in FIG. 7(b). Assuming that the X-axis direction scanning of the screen section 13 with the electron beam is performed linearly at a constant velocity as indicated by solid line 29 in FIGS. 4 and 5, time interval t2 of the second index signals 31 is n times as long as time interval t1 of the first index signals 30 shown in FIG. 7(a) (t2=n·t1). For example, when n=8, t2=8t1.

If, however, the X-axis direction scanning of the electron beam is represented by not a straight line but a upward curved line 29a, as shown by the broken line in FIG. 5, due to a deflection distortion, the time interval t2 between the second index signals 31 is changed to t21 and, as shown in FIG. 7(c), t21 is Δt1 shorter than t2 (t21=t2−Δt1). Consequently, a shift in the electron beam in the Y-axis direction from the X-axis direction scanning line (solid line 29) which is normally straight in the X-axis direction, that is, the position of the electron beam in the Y-axis direction can be detected in response to the second index signals 31 generated from the second index phosphor layers 27.

The time interval of the second index signals 31 is detected and compared with the reference time interval t2 on the basis of which the screen section 13 is linearly scanned with the electron beam at a constant velocity. The drive circuit 54 for driving the main and auxiliary deflection devices 17 and 18 is controlled based on a difference between a detected time interval and the reference time interval t2 such that the scanning lines of the electron beam approach the normal X-axis direction scanning lines 29. As described above, the position of the electron beams in the Y-axis direction is corrected, with the result that the screen section 13 can be linearly scanned with the electron beams in the X-axis direction.

If the Y-axis direction position of the electron beam is corrected in response to the second index signals 31 generated from the second index phosphor layers 27, the time interval t1 of the first index signals 30 generated from the first index phosphor layers 26 changes. In general, however, the curve of the X-axis direction scanning line due to deflection distortion is gentle, so that the change in time interval t1 of the first index signals 30 can be ignored and a feedback system is not disturbed at all.

Moreover, if the X-axis direction scanning of the electron beam is represented by a downward curved line 29b, as indicated by the broken line in FIG. 5, due to a deflection distortion, time interval t22 of the second index signals generated from the second index phosphor layers 27 is Δt1 longer than t2 as shown in FIG. 7(d) (t21=t2+Δt2).

In this case, too, a shift in the electron beam in the Y-axis direction from the normal X-axis direction scanning line, that is, the position of the electron beam in the Y-axis direction can be detected. By controlling the main and auxiliary deflection devices 17 and 18 based on a difference between the reference time interval t2 and the detected time interval of the second index signals 31, the Y-axis direction position of the electron beam can be corrected.

Since the first and second index phosphor layers 26 and 27 are constituted of their respective phosphors having different peak values of emission spectrum, the emissions of these first and second index phosphor layers are detected by the first and second photoelectric conversion devices 20a and 20b, respectively, resulting in no malfunction. The color cathode-ray tube can thus be operated stably.

Figure 8:
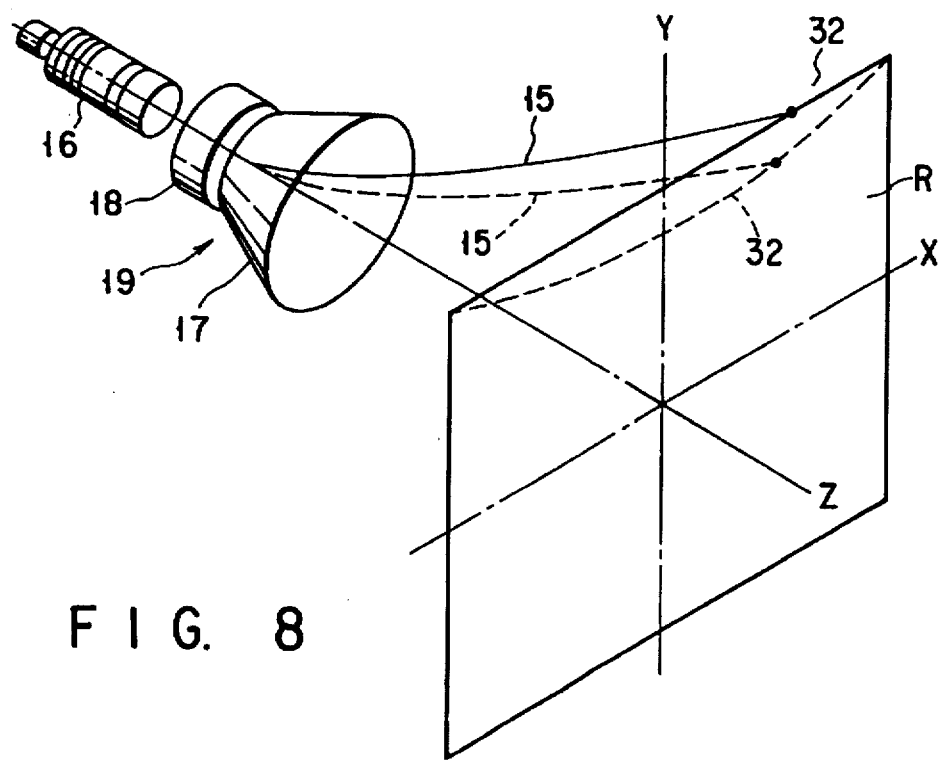

FIG. 8 schematically shows correction of scanning lines with the electron beam in response to the second index signals 31 generated from the second index phosphor layers 27. In FIG. 8, reference symbol R shows one of the regions of the screen section 13 which are to be scanned with the electron beams. When the scanning of the electron beam 15 is not corrected by the second index signals 31, the X-axis direction scanning line of the electron beam for scanning the end portion of the region R in the Y-axis direction is curved like a pincushion, as indicated by broken line 32, by the deflection distortion of the electron beam due to an electric field generated from the main deflection device 17. Since, however, the auxiliary deflection device 18 is supplied with a correction signal in response to the second index signals and corrects the trace of the electron beam 15 as indicated by the solid line, the X-axis direction scanning line of the electron beam 15 for scanning the end portion of the region R in the Y-axis direction can be made straight as indicated by solid line 32.

The change in the X-axis direction scanning line 32, which is represented by the pincushion curve, is gentle and thus cannot be detected by the first index signals generated from the first index phosphor layers 26, whereas it can be done by the second index signals generated from the second index phosphor layers 27 which are inclined to the three-color phosphor layers. If the auxiliary deflection device 18 is controlled in response to the second index signals, the trace of the electron beam 15 is adjusted, and the X-axis direction scanning lines of the electron beam 15 for scanning the Y-axis end portions of each region can be straightened. Thus, the scanning lines, which are curved at the boundaries between adjacent regions in the Y-axis direction, can easily be aligned with each other and the seams between them can be made inconspicuous accordingly.

In the above embodiment, the first index phosphor layers 26 parallel to the three-color phosphor layers and the second index phosphor layers 27 inclined thereto overlap each other such that the second layers 27 are put on the first layer 26. However, the first layers 26 can be laid on the second layers 27. Furthermore, the first index phosphor layers 26 can be prevented from being formed on those portions where the second index phosphor layers 27 are to be formed. Since the section of an electron beam is generally elliptically distorted, these first and second layers 26 and 27 are able to emit light at once to issue first and second index signals simultaneously.

Furthermore, in the above embodiment, the second index phosphor layers 27 are formed above the light absorbing layers 23 and on the first index phosphor layers 26 formed above the layers 23, except on the three-color phosphor layers, but they can be formed on the three-color phosphor layers. If, however, the second index phosphor layers 27 are formed on the three-color phosphor layers, the electron beam, which scans the screen section 13, enters the three-color phosphor layers and makes an impact on them after passing through the second index phosphor layers and the aluminum evaporation film. Thus light emission of those portions of the three-color phosphor layers above which the second index phosphor layers 27 are formed, is likely to reduce. If, however, the X-axis direction arrangement pitch PH2 of the second index phosphor layers 27, that is, n is increased, the reduction in light emission can be mitigated, and a practicable index type color cathode-ray tube can be achieved.

Moreover, in the above mentioned embodiment, the three-color phosphor layers of the screen section 13 are formed like continuous stripes extending in the Y-axis direction. However, the phosphor screen may be a matrix-type screen wherein each of the three-color phosphor layers is formed of a discontinuous stripe constituted of a plurality of phosphor dots of the same color arranged in the Y-axis direction.

In the above embodiment, the video signals are cut off in the over-scan section of adjacent regions by controlling the supply of the video signals to the electron guns. To over-scan the adjacent regions, a shielding member of metal, glass, or the like can be arranged between the screen section and electron guns to shield over-deflected electron beams. With such a shielding member, the video signals need not be cut off in synchronization with the over-deflected electron beams, but the screen section can be over-scanned while the video signals are being supplied to the electron guns.

Figure 9:
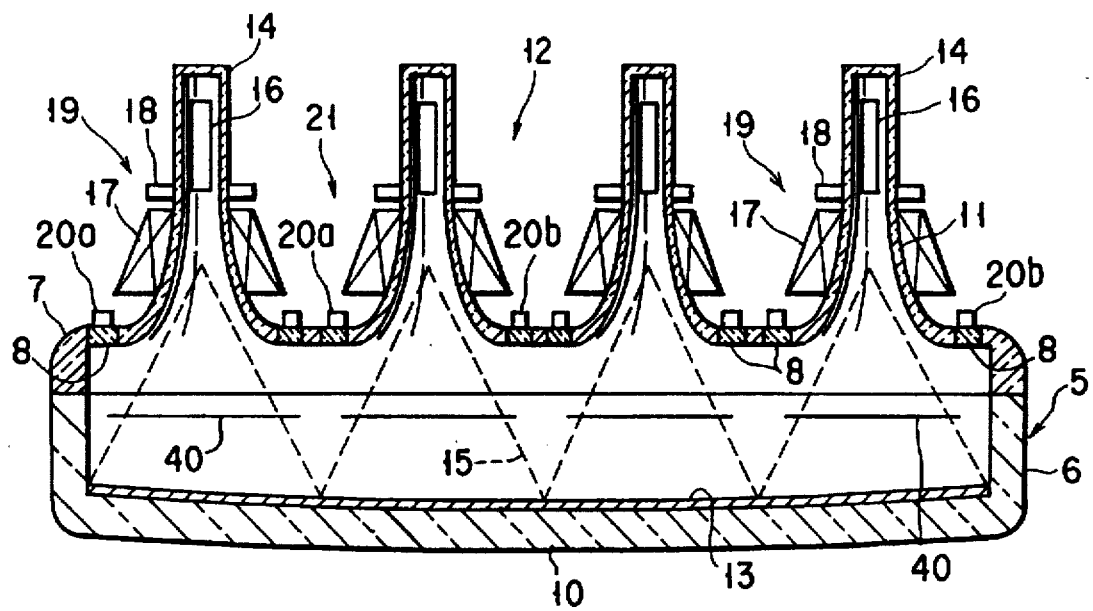
FIG. 9 is a cross-sectional view of a color cathode-ray tube according to another embodiment of the present invention.
Figure 10:
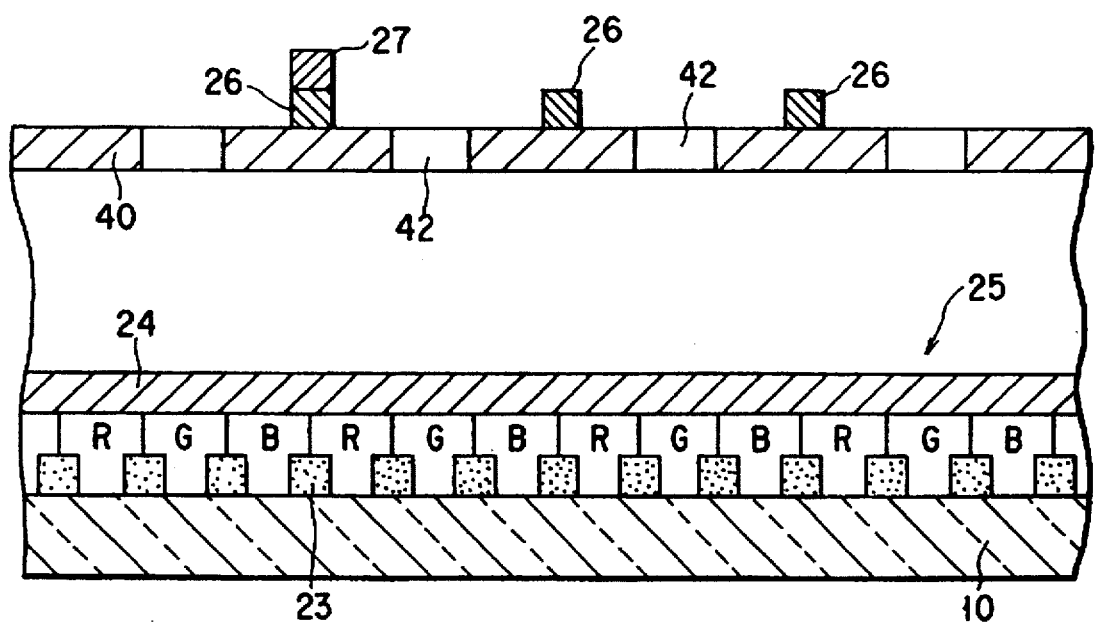
FIG. 10 is an enlarged cross-sectional view of part of the color cathode-ray tube shown in FIG. 9.

FIGS. 9 and 10 illustrate a color cathode-ray tube according to a second embodiment of the present invention, which has a shadow mask as the shielding member described above. A plurality of shadow masks 40 (FIGS. 9–10) are arranged in a vacuum envelope 5 (FIG. 9) of the color cathode-ray tube and opposite to a screen section 13 (FIG. 9). Each of the shadow masks 40 is opposed to a plurality of regions of the screen section 13, e.g., three regions arranged in the Y-axis direction. For example, one shadow mask 40 has such a size as to face regions R1, R5 and R9, and includes three effective portions each having a number of electron beam passage apertures 42 (FIG. 10).

First and second index phosphor layers 26 and 27 (FIG. 10) are formed on that surface of each of the shadow masks 40 which opposes an electron gun thereof. The first index phosphor layers 26 are arranged like a stripe at predetermined pitches in the X-axis direction and each extending in the Y-axis direction. The second index phosphor layers 27 are formed like dots arranged along a plurality of parallel lines which are inclined to the first index phosphor layers 26 at a predetermined angle θ, and these dots are arranged at predetermined pitches in the X-axis direction.

The pattern of the index phosphor layers formed on the shadow masks 40 differs from that on the screen section. The index phosphor layers formed on the respective shadow masks 40 have the same pattern for each of the regions of the screen section 13 which are dividedly scanned.

Assume that each of the regions of the screen section 13 has an X-axis direction measure H of 110 mm and a Y-axis direction measure V of 93 mm, an angle between the first and second index phosphor layers 26 and 27 is θ, and $\theta_1 = \tan^{-1}(V/H)$. When $\theta = \theta_1$ or $\theta < \theta_1$, $\theta = \tan^{-1}(H/nV)$ (n=1, 2, 3, 4, ...). When $\theta > \theta_1$, $\theta = \tan^{-1}(nH/V)$ (n=1, 2, 3, 4, ...).

Since the other components such as photoelectric conversion sections 21 (FIG. 9), the screen scanning method, the index signal basis correcting method, etc. are the same as those in the first embodiment, their detailed descriptions will be omitted. According to the second embodiment, the color selection of electron beams 15 (FIG. 9) in the respective regions of the screen section is performed by the shadow masks 40, and the index signals generated from the first and second index phosphor layers 26 and 27 are employed for correction of raster distortion and beam convergence.

In the second embodiment having the above constitution, too, the trace of the electron beam 15 can be adjusted by controlling an auxiliary deflection device 18 (FIG. 9) in response to the index signals and the X-axis direction scanning lines of the electron beam for scanning the Y-axis direction end portion of each region can be straightened. The scanning lines can thus be easily aligned with each other on the boundary between adjacent regions in the Y-axis direction, with the result that a good image free of conspicuous seams therebetween can be obtained.

Since, furthermore, the first and second index phosphor layers have the same pattern for each of the regions of the screen section, a drive circuit for driving the main and auxiliary deflection devices can be constituted in the same design for each electron gun, thereby greatly decreasing in manufacturing cost of color cathode-ray tubes.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A color cathode-ray tube comprising:
   an envelope including a substantially rectangular face plate having first and second axes crossing each other at right angles;
   a screen section provided on an inner surface of the face plate, the screen section including:
      a phosphor screen having a plurality of three-color phosphor layers, each of the three-color phosphor layers extending along the first axis and being arranged in series in a direction along the second axis,
      a plurality of first index phosphor layers being provided on the phosphor screen and extending in parallel to the three-color phosphor layers, and
      a plurality of second index phosphor layers being provided on the phosphor screen and inclined to the three-color phosphor layers at a predetermined angle;
   a plurality of electron guns, provided in the envelope, for emitting electron beams to the screen section and dividedly scanning a plurality of regions of the screen section, each of the first index phosphor layers having a same first pattern in each of the regions of the screen section, and each of the second index phosphor layers having a same second pattern in each of the regions of the screen section;
   a plurality of deflectors for deflecting the electron beams emitted from the respective electron guns;
   a plurality of photoelectric conversion sections provided in correspondence with the regions of the screen section, each of the photoelectric conversion sections including a first photoelectric converter for detecting first index signals generated from the first index phosphor layers by scanning the electron beams, and a second photoelectric converter for detecting second index signals generated from the second index phosphor layers by scanning the electron beams; and
   a controller for controlling the deflectors in response to the first and second index signals detected by the photoelectric conversion sections,
   wherein assuming that a measure of each region of the screen section along the first axis is V, a measure of each region of the screen section along the axis is H, the predetermined angle is θ, and the angle θ1=tan⁻¹(V/H), the angle θ is equal to tan⁻¹+(H/nV) (N=1, 2, 3, 4, . . . ) for θ<θ1, and the angle θ is equal to tan⁻¹(nH/V) (n–1, 2, 3, 4, . . . ) for θ>θ1.

2. A color cathode-ray tube according to claim 1, wherein said phosphor screen includes a plurality of light shielding layers each formed between the three-color phosphor layers and extending along the first axis, and the first index phosphor layers are arranged over the light shielding layers, respectively.

3. A color cathode-ray tube according to claim 1, wherein the first index phosphor layers are constituted of phosphors having a peak value of emission spectrum different from that of phosphors constituting the second index phosphor layers.

4. A color cathode-ray tube according to claim 1, wherein the envelope includes a substantially rectangular rear plate arranged substantially in parallel to and opposite to the face plate, a plurality of funnels attached to the rear plate and incorporating the respective electron guns, and a plurality of light-transmittable windows formed in the rear plate, and the first and second photoelectric conversion means are provided on the rear plate so as to face the light-transmittable windows, respectively.

5. A color cathode-ray tube comprising:

an envelope including a substantially rectangular face plate having first and second axes crossing each other at right angles;

a screen section provided on an inner surface of the face plate, the screen section including a phosphor screen having a plurality of three-color phosphor layers, each of the three-color phosphor layers extending along the first axis and being arranged in series in a direction along the second axis;

a shadow mask arranged in the envelope so as to face the screen section;

a plurality of first index phosphor layers provided on the shadow mask in parallel to the plurality of three-color phosphor layers;

a plurality of second index phosphor layers provided on the shadow mask and inclined to the three-color phosphor layers at a predetermined angle;

a plurality of electron guns provided in the envelope, for emitting electron beams to the screen section through the shadow mask and dividedly scanning a plurality of regions of the screen section, each of the first index phosphor layers having a same first pattern in each of the regions of the screen section, and each of the second index phosphor layers having a same second pattern in each of the regions of the screen section;

a plurality of deflectors for deflecting the respective electron beams emitted from the electron guns;

a plurality of photoelectric conversion sections provided in correspondence with the regions of the screen section, each of the plurality of photoelectric conversions sections including a first photoelectric converter for detecting first index signals generated from the first index phosphor layers by scanning of the electron beam, and a second photoelectric converter for detecting second index signals generated from the second index phosphor layers by scanning of the electron beam; and a controller for controlling the deflectors in response to the first and second index signals detected by the photoelectric conversion sections, wherein assuming that a measure of each region of the screen section along the first axis is V, a measure of each region of the screen section along the axis is H, the predetermined angle is θ, and θ1=tan⁻¹(V/H), the angle θ is equal to tan⁻¹+(H/nV) (N=1, 2, 3, 4, . . . ) for θ<θ1, and the angle θ is equal to tan⁻¹(nH/V)(n–1, 2, 3, 4, . . . ) for θ>θ1.

6. A color cathode-ray tube according to claim 5, wherein the first index phosphor layers are constituted of phosphors having a peak value of emission spectrum different from that of phosphors constituting the second index phosphor layers.

7. A color cathode-ray tube according to claim 5, wherein the envelope includes a substantially rectangular rear plate arranged substantially in parallel to and opposite to the face plate, a plurality of funnels attached to the rear plate and incorporating the respective electron guns, and a plurality of light-transmittable windows formed in the rear plate, and the first and second photoelectric conversion means are provided on the rear plate so as to face the light-transmittable windows, respectively.

* * * * *